(12) United States Patent
Rushin et al.

(10) Patent No.: US 9,758,251 B2
(45) Date of Patent: Sep. 12, 2017

(54) AIRCRAFT EMERGENCY ESCAPE SLIDE CONTAINER AND METHOD OF CHANGING AN AIRCRAFT EMERGENCY ESCAPE SLIDE

(71) Applicant: UNITED AIRLINES, INC., Chicago, IL (US)

(72) Inventors: William J. Rushin, Greenwood, IN (US); Edison Herrera, Yorkville, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 230 days.

(21) Appl. No.: 13/836,127

(22) Filed: Mar. 15, 2013

(65) Prior Publication Data

US 2014/0262614 A1    Sep. 18, 2014

(51) Int. Cl.
*B64D 25/14* (2006.01)
*B65D 6/00* (2006.01)
*B65D 25/20* (2006.01)
*A62B 1/20* (2006.01)

(52) U.S. Cl.
CPC .............. *B64D 25/14* (2013.01); *B65D 11/10* (2013.01); *B65D 25/20* (2013.01); *A62B 1/20* (2013.01); *Y10T 29/49716* (2015.01)

(58) Field of Classification Search
CPC .. B63C 9/23; B63C 9/22; B64D 25/14; B64D 25/04; B64D 11/10; A62B 1/20; B63B 2027/145; Y10S 244/905; B65D 21/0234; B65D 11/18; B65D 21/0217; B65D 11/105; B65D 11/26; B65D 11/28; B65D 1/46; B65D 1/48; B65D 11/10; B65D 85/64; B65D 25/20; B25H 3/023; B65B 63/02; Y10T 29/49716; A45C 13/02; A45C 13/30; A45C 5/03

See application file for complete search history.

(56) References Cited

U.S. PATENT DOCUMENTS

| | | | | |
|---|---|---|---|---|
| 2,609,549 | A | * | 9/1952 | Krupp .............................. 441/42 |
| 3,084,830 | A | * | 4/1963 | Koelsch ......................... 206/504 |
| 3,244,311 | A | * | 4/1966 | Lawson ............. B65D 21/0234 206/386 |
| 3,266,655 | A | * | 8/1966 | Trunk ....................... B63C 9/22 220/4.24 |

(Continued)

*Primary Examiner* — Alvin Chin-Shue
*Assistant Examiner* — Shiref Mekhaeil
(74) *Attorney, Agent, or Firm* — Marshall, Gerstein & Borun LLP

(57) ABSTRACT

An emergency escape slide container includes a first portion having a first end wall and a first side wall, the first side wall and the first end wall defining a first storage space that is sized and shaped to receive an emergency escape slide. The first side wall also includes a first rolling mechanism. The emergency escape slide container also includes a second portion having a second end wall and a second side wall, the second side wall and the second end wall defining a second storage space sized and shaped to receive the emergency escape slide. The second side wall also includes a second rolling mechanism. The first portion and the second portion cooperate to define a third storage space therebetween, the third storage space being equal to a combination of the first storage space and the second storage space.

19 Claims, 3 Drawing Sheets

(56) References Cited

U.S. PATENT DOCUMENTS

| | | | | |
|---|---|---|---|---|
| 3,326,408 A * | 6/1967 | Ringlen | ............ | B65D 21/0234 206/518 |
| 3,387,811 A * | 6/1968 | Adams, Jr. | ............ | 248/146 |
| 3,407,961 A * | 10/1968 | Box | ............ | A01K 31/002 206/511 |
| 3,561,634 A * | 2/1971 | Meldrum | ............ | B65D 88/12 220/1.5 |
| 3,934,747 A * | 1/1976 | Needt | ............ | B65D 11/02 220/4.05 |
| 4,079,835 A * | 3/1978 | Kendig | ............ | B65D 85/672 206/303 |
| 4,147,369 A * | 4/1979 | Simpson | ............ | B65D 25/24 190/18 A |
| 4,280,239 A * | 7/1981 | Brown | ............ | B63C 9/04 441/42 |
| 4,355,987 A * | 10/1982 | Miller | ............ | 441/41 |
| 4,375,877 A * | 3/1983 | Shorey | ............ | B64D 25/14 182/48 |
| 4,385,415 A * | 5/1983 | Volz | ............ | A45C 5/14 16/29 |
| 4,534,445 A * | 8/1985 | Fisher | ............ | B64D 25/14 182/48 |
| 4,550,931 A * | 11/1985 | Ziaylek, Jr. | ............ | A45C 13/262 280/47.26 |
| 4,582,166 A * | 4/1986 | Baker | ............ | 182/48 |
| 4,790,256 A * | 12/1988 | Levine | ............ | B63B 7/04 114/352 |
| 4,794,876 A * | 1/1989 | Levine | ............ | B63B 7/04 114/352 |
| 4,800,835 A * | 1/1989 | Mears | ............ | 116/210 |
| 4,854,602 A * | 8/1989 | Takeuchi | ............ | A45C 13/02 190/122 |
| 5,158,209 A * | 10/1992 | Reil | ............ | B65D 1/30 215/6 |
| 5,224,635 A * | 7/1993 | Wise | ............ | 222/608 |
| 5,253,739 A * | 10/1993 | King | ............ | 190/18 A |
| 5,332,114 A * | 7/1994 | Sano | ............ | B65D 21/0234 206/505 |
| 5,505,297 A * | 4/1996 | Myers | ............ | A45C 3/004 190/125 |
| 5,603,402 A * | 2/1997 | Cuneo | ............ | 206/320 |
| 5,794,818 A * | 8/1998 | Bromwell | ............ | B65D 11/10 220/684 |
| 5,992,588 A * | 11/1999 | Morszeck | ............ | 190/18 A |
| 6,340,105 B1 * | 1/2002 | Black | ............ | B60R 9/00 211/85.18 |
| 6,591,950 B1 * | 7/2003 | Scicluna | ............ | A45C 7/0027 190/103 |
| 6,595,354 B1 * | 7/2003 | Scicluna | ............ | A45C 13/03 206/279 |
| 7,232,018 B1 * | 6/2007 | Salander | ............ | A45C 5/14 190/103 |
| 7,699,149 B2 * | 4/2010 | Lin | ............ | A45C 7/0022 190/103 |
| 8,596,433 B2 * | 12/2013 | Tauro | ............ | 190/18 R |
| 2001/0011620 A1 | 8/2001 | Tiramani et al. | ............ | 190/124 |
| 2003/0171045 A1 | 9/2003 | Richard | ............ | B65D 21/0223 441/42 |
| 2004/0074902 A1 * | 4/2004 | Hayes | ............ | B65D 1/34 220/4.21 |
| 2004/0239435 A1 * | 12/2004 | Hughes et al. | ............ | 333/1.1 |
| 2006/0124418 A1 * | 6/2006 | Scicluna | ............ | A45C 13/03 190/110 |
| 2007/0215424 A1 * | 9/2007 | Mittleman | ............ | 190/18 A |
| 2008/0128231 A1 * | 6/2008 | Newman | ............ | A45C 7/0045 190/108 |
| 2008/0188148 A1 * | 8/2008 | Simon-Bouhet | ............ | 441/41 |
| 2009/0057305 A1 * | 3/2009 | Moreau | ............ | B60R 5/04 220/4.27 |
| 2009/0166141 A1 * | 7/2009 | Davis et al. | ............ | 190/18 A |
| 2011/0147385 A1 * | 6/2011 | Forrest | ............ | B25H 3/023 220/324 |
| 2011/0291607 A1 * | 12/2011 | Rossi | ............ | A45C 5/03 320/101 |
| 2012/0247897 A1 * | 10/2012 | Sheikh | ............ | 190/115 |
| 2013/0015639 A1 * | 1/2013 | Bengtzen | ............ | A45C 5/04 280/651 |
| 2013/0213737 A1 * | 8/2013 | Bambrick | ............ | A62B 1/20 182/18 |
| 2014/0220184 A1 * | 8/2014 | Boggs | ............ | B65D 81/02 426/87 |
| 2014/0262614 A1 * | 9/2014 | Rushin | ............ | B65D 11/10 182/48 |
| 2014/0299430 A1 * | 10/2014 | Tseng et al. | ............ | 190/107 |
| 2014/0353104 A1 * | 12/2014 | Sheikh | ............ | A45C 5/06 190/119 |
| 2015/0014108 A1 * | 1/2015 | Vecellio | ............ | A45C 13/02 190/100 |
| 2015/0076021 A1 * | 3/2015 | Ordonez | ............ | A62B 1/20 206/335 |

* cited by examiner

AIRCRAFT EMERGENCY ESCAPE SLIDE CONTAINER AND METHOD OF CHANGING AN AIRCRAFT EMERGENCY ESCAPE SLIDE

BACKGROUND

Field of the Disclosure

The disclosure generally relates to containers for aircraft emergency equipment and to methods of changing aircraft emergency equipment, and more specifically to containers for aircraft emergency escape slides and methods of changing aircraft emergency escape slides.

Related Technology

Modern passenger aircraft require quick egress options in case of emergency. Because many modern passenger aircraft have entry doors that are ten feet or more above ground level, passengers need some sort of device to allow them to get to the ground safely. Inflatable emergency escape slides have been used for this purpose. The emergency escape slide is usually made from an inflatable flexible material. When not inflated, the emergency escape slide is folded up into a small volume and stored in or near the egress door. When needed, the emergency escape slide is filled with a gas so that it inflates to a semi-rigid slide structure that extends from the egress door to the ground. While this solution to speedy egress of a passenger aircraft has generally been very successful, the emergency escape slides require periodic checking, maintenance, and/or replacement to ensure that the emergency escape slides will operate correctly in the case of an emergency.

In large passenger aircraft (in particular in wide-body, long range aircraft), these emergency escape slides can weigh 100 to 150 lbs (45-68 kg) or more. Moreover, these large passenger aircraft can have eight or more emergency escape slides. In order to change or maintain these emergency escape slides, maintenance personnel must carry a folded slide into the aircraft through the egress door. After entering the aircraft, the folded slide must be carried down an aircraft aisle to the correct egress door. Once position by the correct egress door, maintenance personnel must remove the old slide and then lift and position the new slide in the correct location. Often during transport of the new slide to the correct egress location, the new egress slide can become hooked or torn on various aircraft parts, which would require a new slide to be obtained. Additionally, due to the weight of the slides, maintenance personnel are often injured during the transfer process by bending over to pick up the slide off of the ground.

Additionally transportation and storage of the slides when not installed in an aircraft can be a problem. Typically, the slides are stored in a wooden container that is liftable by a forklift. These wooden containers are very heavy and not very durable. Furthermore, lifting the slide out of the wooden container requires maintenance personnel to bend over, which subjects the maintenance personnel to the possibility of back or other injuries. These injuries result in a loss of workdays and a loss of efficiency, which can be a problem for the employer.

SUMMARY OF THE DISCLOSURE

In accordance with one exemplary aspect of the invention, an emergency escape slide container includes a first portion having a first end wall and a first side wall, the first side wall and the first end wall defining a first storage space that is sized and shaped to receive an emergency escape slide. The first storage space includes a first restraining mechanism for the emergency escape slide. The first side wall includes a first rolling mechanism. The emergency escape slide container also includes a second portion having a second end wall and a second side wall, the second side wall and the second end wall defining a second storage space sized and shaped to receive the emergency escape slide. The second storage space includes a second restraining mechanism for the emergency escape slide. The second side wall includes a second rolling mechanism. The first portion and the second portion cooperate to define a third storage space therebetween, the third storage space being equal to a combination of the first storage space and the second storage space.

In further accordance with any one or more of the foregoing aspects, an emergency escape slide container may include any one or more of the following preferred forms.

In one preferred form, the emergency escape slide container may include an emergency escape slide disposed within the first storage space.

In another preferred form, the first rolling mechanism may include a first roller and a second roller, the first roller may be an omni-roller and the second roller may be a cylindrical nylon roller.

In yet another preferred form, an outer surface of the first portion may include a first recessed groove, the first recessed groove being sized to receive a fork of a forklift.

In yet another preferred form, the emergency escape slide container may include a skid mounted on the first portion, the skid extending outward away from an outer surface of the first end wall.

In yet another preferred form, the emergency escape slide container may include a recess on the outer surface of the first end wall, the recess being sized and shaped to receive a portion of a skid.

In yet another preferred form, the emergency escape slide container may include a skid that is removably attached to the first portion with a removable fastener, in some preferred forms the fastener may be a thumb nut.

In yet other preferred forms, the first side wall may include a first plurality of tongues and a first plurality of grooves and the second side wall may include a second plurality of tongues and a second plurality of grooves, the first plurality of tongues being sized and shaped to be received by the second plurality of grooves and the second plurality of tongues being sized and shaped to be received by the first plurality of grooves. In other preferred forms, the first plurality of tongues and the second plurality of grooves may be arranged to locate the first rolling mechanism on an opposite side of the container from the second rolling mechanism.

In yet other preferred forms, the first portion may be identical to the second portion.

In yet other preferred forms, the container may be made of one of plastic and metal.

In yet other preferred forms, the first restraining mechanism may be a belt strap.

In yet other preferred forms, the emergency escape slide container may include a first handle on an outer surface of the first side wall.

In yet other preferred forms, the emergency escape slide may include a locking mechanism that releasably secures the first portion to the second portion.

In yet other preferred forms, the first storage space may have a length of about 43.75 inches (111.12 cm), a width of about 28.75 inches (73.025 cm), and a depth of about 11 inches (27.94 cm).

In yet other preferred forms, the emergency escape slide container may include a raised ridge on an outer surface of the first end wall.

In accordance with another exemplary aspect of the invention, a method of changing an emergency escape slide on an aircraft includes providing a replacement emergency escape slide within a container, the container having a first portion and a second portion removably attached to one another, the first portion and the second portion defining a first storage space and a second storage space, respectively. The first portion and the second portion are separated so that the replacement emergency escape slide remains attached to the first portion and at least partially disposed within the first storage space. The first portion is placed on a surface of an aircraft so that a rolling mechanism is disposed between the first portion and the surface. The first portion is moved on the surface to a predetermined location proximate an egress door of an aircraft. The first storage space is oriented to be adjacent to an emergency escape slide storage location on the aircraft. The emergency escape slide is separated from the first portion, and the emergency escape slide is secured to the emergency escape slide storage location.

In other preferred forms, the method may include transporting the second portion to the predetermined location proximate the egress door. The second portion may be oriented so that the second storage space is adjacent the emergency escape slide storage location. An existing emergency escape slide may be released from the emergency escape slide storage location, and the existing emergency escape slide may be secured to the second portion so that the existing emergency escape slide is at least partially disposed within the second storage space.

BRIEF DESCRIPTION OF THE DRAWINGS

Objects, features, and advantages of the present invention will become apparent upon reading the following description in conjunction with the drawing figures, in which.

DETAILED DESCRIPTION

The emergency escape slide containers described herein advantageously allow an inflatable emergency escape slide to be stored and transported in a single container from a storage facility to an emergency escape slide storage location on aircraft. These emergency escape slide containers facilitate movement of the emergency escape slide by forklift or other transportation device from a storage location in a storage facility to an aircraft and then to a predetermined location in an aircraft. The emergency escape slide containers are robust and yet lightweight so that they are easily maneuverable within an aircraft by one or two maintenance personnel. Moreover, the emergency escape slide containers are sized to accommodate deflated and folded emergency escape slide in one portion and another deflated and folded emergency escape slide in another portion so that the container itself can be used to remove an existing emergency escape slide and to install a replacement emergency escape slide on an aircraft. The emergency escape slide containers also reduce on-the-job injuries because the emergency escape slide does not need to be removed from the container before transporting the emergency escape slide within an aircraft.

Turning now to FIGS. 1-6, one embodiment of an emergency escape slide storage container 10 is illustrated. The emergency escape slide storage container 10 includes a first or upper portion 12 and a second or lower portion 14 removably attached to one another. Generally speaking, the first portion 12 and the second portion 14 combine to store a deflated emergency escape slide therebetween. The first portion 12 and the second portion 14 protect the emergency escape slide during storage and transportation. Moreover, the first portion 12 and the second portion 14 may be separated from one another so that the emergency escape slide remains attached to one of the first portion 12 and the second portion 14. The portion of the container to which the emergency escape slide remains attached is light enough and maneuverable enough to be transported down and aisle of the passenger aircraft by one or two maintenance personnel. In some embodiments, the first portion 12 and the second portion 14 may be identical to one another. In other embodiments, the first portion 12 and the second portion 14 may have slight differences as long as the first portion 12 and the second portion 14 are removably attachable to one another and that either the first portion 12 or the second portion 14 may be transported down an aisle of an aircraft with an emergency escape slide.

Figure 3:
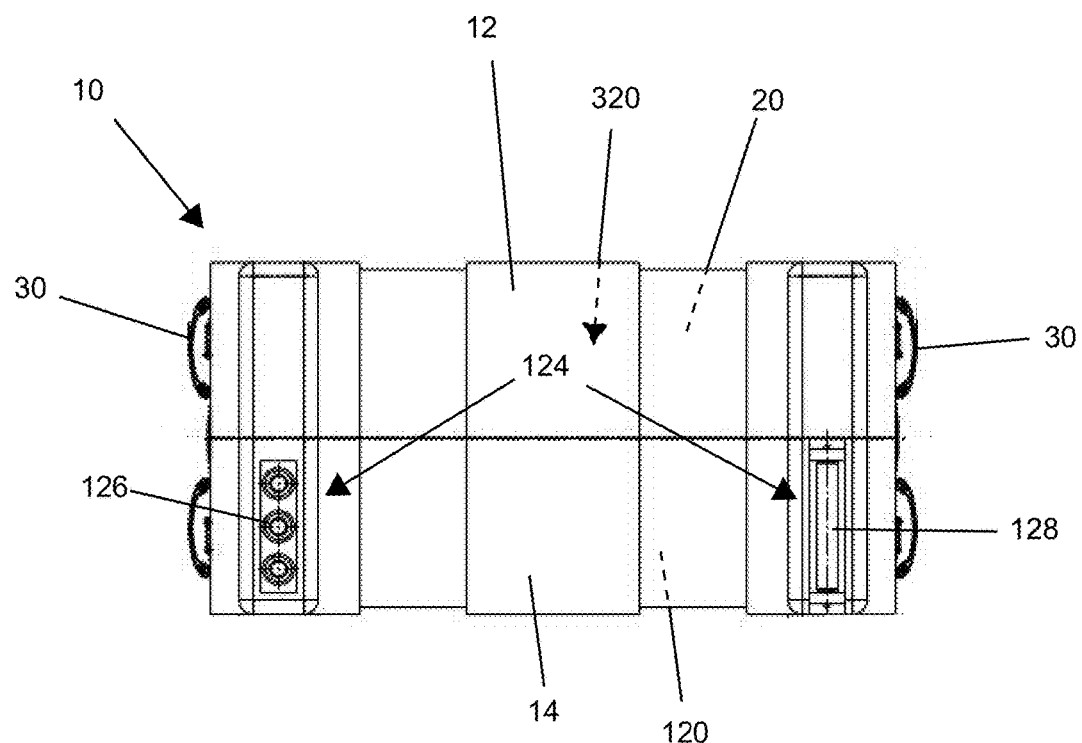
FIG. 3 is a front view of the aircraft emergency escape slide container of FIG. 1.
Figure 4:
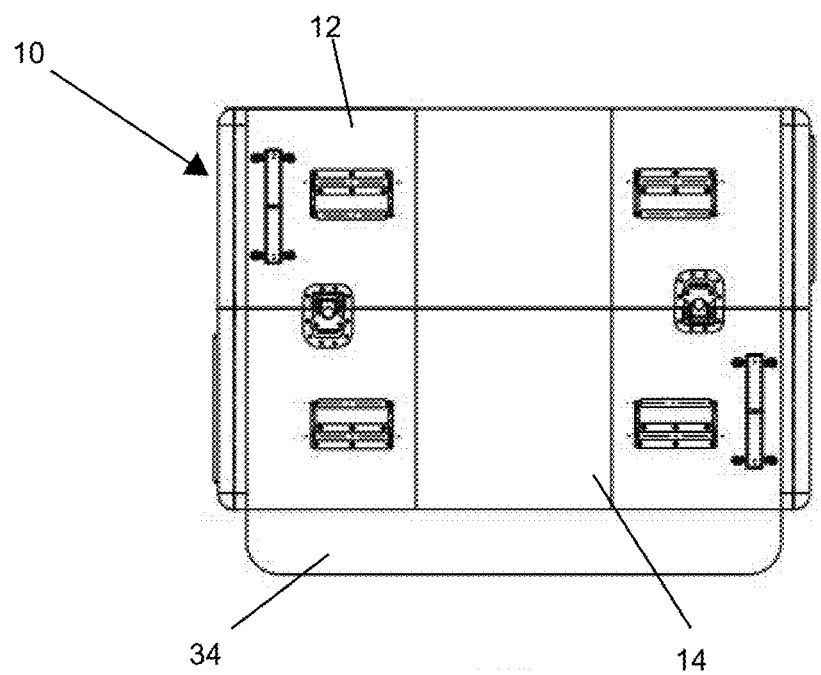
FIG. 4 is a side view of the aircraft emergency escape slide container of FIG. 1.

The first portion 12 may include a first end wall 16 and a first sidewall 18. Similarly, the second portion 14 may include a second end wall 116 and a second sidewall 118. The first end wall 16 and the first sidewall 18 define a first storage space 20 (FIG. 6). Similarly, the second end wall 116 and the second sidewall 118 form a second storage space 120 (FIG. 3). The first portion 12 and the second portion 14 together form a third storage space 320 that is equal to a combination of the first storage space 20 and the second storage space 120. The first storage space 20 is sized and shaped to receive the emergency escape slide 200. Similarly, the second storage space 120 is sized and shaped to receive the emergency escape slide 200. In the embodiment illustrated in FIGS. 1-6, the first sidewall 18 may include a plurality of sidewall portions 18a, 18b 18c, 18d that form a rectangular shape. In other embodiments, the sidewall 18 may include more or fewer sidewall portions that the fine other shapes such as circles, ovals, squares, polygons, or any other regular or irregular shapes, as long as the storage space defined by such shapes is capable of receiving an emergency escape slide.

A first restraining mechanism 22, such as belt, may be disposed within the first storage space 20. In some embodiments a second restraining mechanism 23 may also be disposed in the first storage space 20. In other embodiments, the first restraining mechanism 22 and/or the second restraining mechanism 23 may include other types of restraining devices, such as, strings, ropes, hook and loop fasteners, doors, clasps, clamps, or any other device that may be used to removably secure an emergency escape slide within the first storage space 20. The first restraining mechanism 22 may also include a plurality of restraining devices, such as a plurality of belts or a plurality of strings or ropes.

When disposed in the first storage space 20, the emergency escape slide is releasably secured to the first portion 12 with at least the first restraining mechanism 22 and/or with the second restraining mechanism 23, so that the first portion 12 may be rotated lifted or otherwise oriented in any position and the emergency escape slide will not fall out of the first storage space 20.

Figure 1:
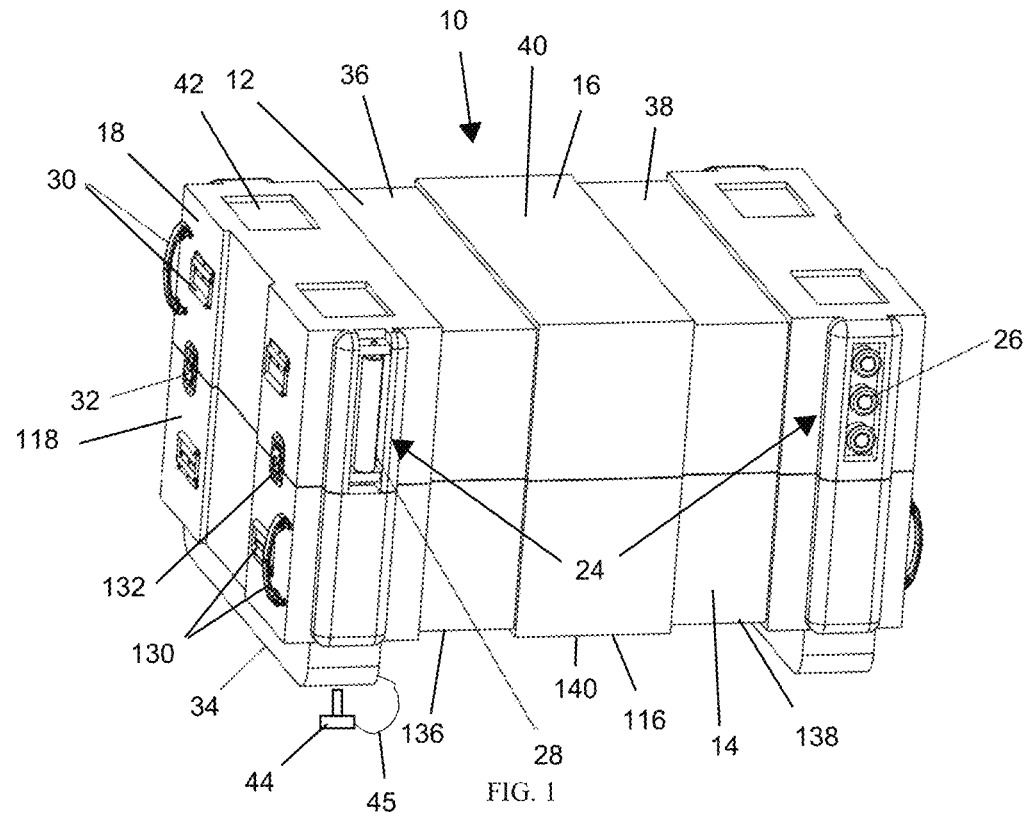
FIG. 1 is a perspective view of an aircraft emergency escape slide container.
Figure 2:
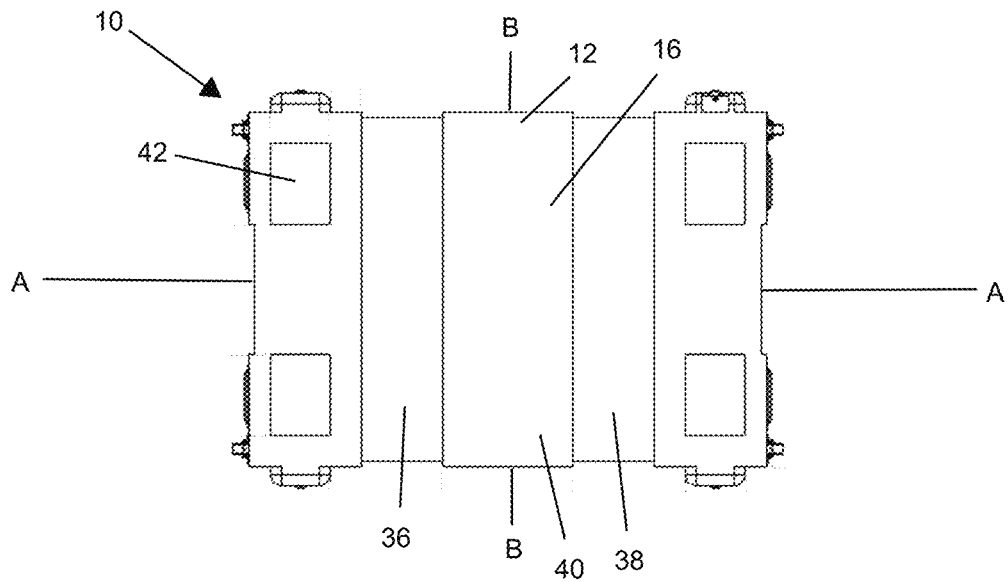
FIG. 2 is a top view of the aircraft emergency escape slide container of FIG. 1.

An outer surface of the first sidewall 18 may include a first rolling mechanism 24 (FIG. 1). The first rolling mechanism 24 may include one or more ball rollers 26, such as omni rollers, that allow the first portion 12 to roll in any direction on a surface, such as an aircraft floor. The first rolling mechanism 24 may also include a unidirectional roller, such as a cylindrical nylon roller 28. By orienting the first portion 12 so that the first rolling mechanism 24 contacts the surface, the first portion 12 may be easily rolled along the surface by one or more maintenance personnel without having to lift the first portion 12 off of the surface.

The first portion 12 may also include one or more handles 30 to enhance the maneuverability of the first portion 12. The first portion 12 may further include one or more locking mechanisms 32, such as locking clasps or latches, that are capable of releasably securing the first portion 12 to the second portion 14. Similarly, the second portion 14 may include one or more handles 130 and/or one or more locking mechanisms 132.

A skid 34 may be removably attached to an outer surface of the first end wall 16 or to an outer surface of the second end wall 116. The skid 34 may extend outwards away from the outer surface of the first end wall 16 or the second end wall 116 so that the first portion 12 or the second portion 14 is elevated above a surface, such as an aircraft floor, when the skid 34 is resting on the surface.

The outer surface of the first end wall 16 or the outer surface of the second end wall 116 may also include a first recessed groove 36, 136, and a second recessed groove 38, 138, that are separated by a raised ridge 40, 140. The first recessed groove 36, 136 and the second recessed groove 38, 138 may be sized and shaped to receive a first fork of a forklift and a second fork of a forklift, respectively. The skid 34 and the recessed grooves 36, 136, 38, 138 combine to allow a forklift to lift the container 10 off of the surface when the container 10 is resting on the surface, such as when the container 10 is resting on the ground in a storage facility or on top of another container. As a result, the container 10 may be easily transported from the storage facility to a passenger aircraft by transportation device such as a forklift. The recessed grooves 36, 136, 38, 138 may be oriented generally perpendicular to a longitudinal axis A and generally parallel to a lateral axis B so that the recessed grooves 36, 136, 38, 138 traverse the container 10 in a generally widthwise manner. In other embodiments, the recessed grooves 36, 136, 38, 138 may traverse the container in a generally lengthwise manner.

The outer surface of the end wall 16, 116 may also include one or more recessed landings 42 that are sized and shaped to receive a portion of the skid 34. The recessed landings 42 locate and stabilize the skid 34 on the end wall 16, 116. The skid 34 may be removably attached to the end wall 16, 116 with a plurality of removable fasteners 44, such as thumbscrews, wing nuts, screws, clasps, latches, or any other removable fastener. The removable fasteners 44 may be secured to the skid 34 with a lanyard 45, or other securing device, so that the fasteners 44 do not become lost.

Figure 5:
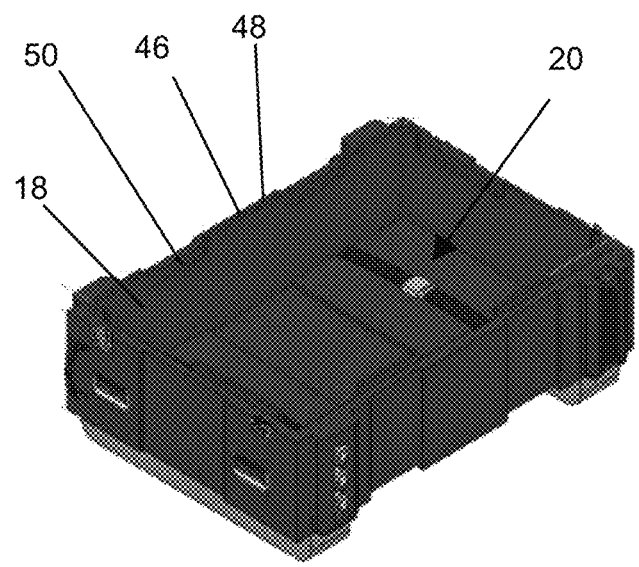
FIG. 5 is a top perspective view of an upper portion of the aircraft emergency escape slide container of FIG. 1, the upper portion being flipped over so that an interior storage space is visible.
Figure 6:
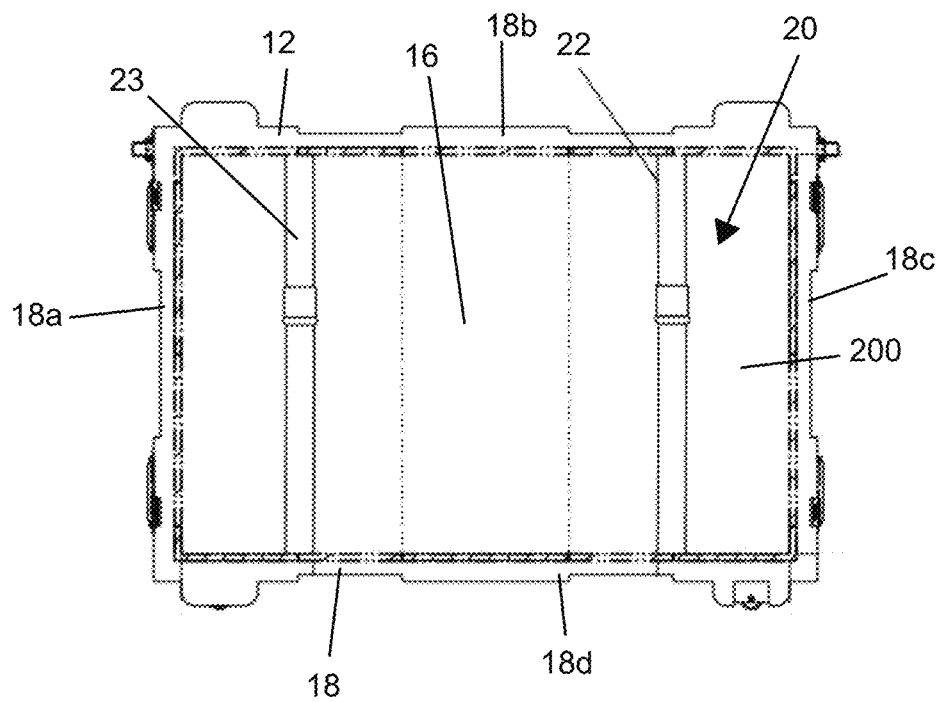
FIG. 6 is a top plan view of the upper portion of the aircraft emergency escape slide container of FIG. 5.

A distal portion 46 of the sidewall 18, 118 (i.e., distal to the end wall 16, 116) may include a plurality of tongues 48 and a plurality of grooves 50 (FIG. 5). The plurality of tongues 48 and the plurality of grooves 50 interact with corresponding tongues and grooves on the second portion 14 two locate and stabilize the first portion 12 on the second portion 14, or vice versa. Furthermore, the plurality of tongues and grooves on the first portion interact with the plurality of tongues and grooves on the second portion to locate the first rolling mechanism 24 on an opposite side of the container 10 from the second rolling mechanism 124.

Hereinafter, a method of replacing an emergency escape slide on aircraft will be described. Initially, an emergency escape slide may be stored in one of the containers 10 described above. The container 10 may be housed in a storage facility. The container 10 may be transported from the storage facility to the passenger aircraft with a forklift or other transportation device. In particular, the forklift may approach the container 10, and orient forks generally parallel to the recessed grooves 36, 136, 38, 138. Because the container 10 is elevated off of the ground or off of a lower container 10 the forks of the forklift easily slide into the recessed grooves 36, 38. The forklift may then lift the container 10 off of the ground or off of another container 10. The forklift may then carry the container 10 to the passenger aircraft. Once the forklift is arrived at the passenger aircraft, the container 10 may be lowered to the ground and the forks of the forklift may be removed from the recessed grooves 36, 136, 38, 138. Once located on the ground, maintenance personnel may remove the first portion 12 from the second portion 14, the emergency escape slide remaining attached the second portion 14.

The first portion 12 may be rotated so that the first rolling mechanism 24 is oriented downwardly, towards a floor of the aircraft cabin. Once resting on the first rolling mechanism 24, maintenance personnel may roll the first portion on the floor of the aircraft cabin, and down an aisle of the aircraft if needed, until the first portion 12 arrives in a predetermined location proximate an emergency escape slide storage location. In some aircraft, the emergency escape slide storage location is attached to (or otherwise proximate or adjacent to) an egress door. The first portion 12 may be oriented so that the first storage space 20 faces the emergency escape slide storage location. An existing emergency escape slide may then be released from the emergency escape slide storage location and moved into the first storage space 20 of the first portion 12. Once located in the first storage space 20 the emergency escape slide may be secured to within the first storage space 20 by the first securing mechanism 22 and/or by the second securing mechanism 23. After the existing emergency escape slide is secured within the first storage space 20, the first portion 12 may be reoriented so that the first rolling mechanism 24 is again resting on the floor of the aircraft cabin, and maintenance personnel may then roll the first portion 12 with the existing emergency escape slide to a door of the aircraft were the first portion 12 and the existing emergency escape slide may be then removed from the aircraft.

Once the existing emergency escape slide is removed from the aircraft, the second portion 14 with a replacement emergency escape slide secured in a second storage space 120 may be moved through the aircraft door and the aircraft cabin. Once located in the aircraft cabin, the second portion 14 may be oriented so that the second rolling mechanism 124 is located on the floor of the aircraft cabin. The second portion 14 may then easily be rolled along the floor of the aircraft cabin, and down an aisle of the aircraft if needed, until the second portion 14 arrives in a predetermined location proximate the emergency escape slide storage location.

Once arriving at the predetermined location proximate the emergency escape slide storage location, the second portion 14 may be oriented so that the second storage space 120 faces the emergency escape slide storage location. Thereafter, the replacement emergency escape slide may be released from the second portion 14 and moved into the emergency escape slide storage location. Once replacement emergency escape slide is secured in the emergency escape slide storage location, second portion 14 may be oriented so that the second rolling mechanism 124 is located proximate the floor the cabin. The second portion 14 may then be rolled along the cabin floor to an exit of the aircraft. After removing the second portion 14 from the aircraft, the second portion 14 may be joined to the first portion 12 and releasably secured to the first portion 12 with the locking mechanisms 32, 132 so that the existing emergency escape slide is disposed between the first portion 12 and the second portion 14. Thereafter, the container 10 may be transported to a storage location with a forklift or other transportation device.

The foregoing detailed description has been given for clearness of understanding only and no unnecessary limitations should be understood therefrom, as modifications will be obvious to those skilled in the art.

The invention claimed is:

1. An emergency escape slide container comprising:
   an emergency escape slide;
   a first portion including a first end wall and a first side wall, the first side wall and the first end wall defining a first storage space that receives the emergency escape slide, the storage space including a first restraining mechanism for the emergency escape slide, and the first side wall including a first rolling mechanism;
   a second portion including a second end wall and a second side wall, the second side wall and the second end wall defining a second storage space sized and shaped to receive the emergency escape slide, the second storage space including a second restraining mechanism for the emergency escape slide, and the second side wall including a second rolling mechanism;
   a first skid and a second skid each removably secured to the first portion, the first skid and the second skid each extending outward away from an outer surface of the first end wall,
   wherein each of the first skid and the second skid extends along a longitudinal axis from a first end to a second end, wherein (i) the first end of each of the first skid and the second skid is disposed adjacent to a first perimeter edge of the outer surface of the first end wall and (ii) the second end of each of the first skid and the second skid is disposed adjacent to a second perimeter edge of the outer surface of the first end wall, each of the first skid and the second skid having a contact portion that extends from a point adjacent the first end to a point adjacent to the second end of each of the first skid and the second skid, and wherein at least a portion of the contact portion of each of the first skid and the second skid is adapted to contact a surface to support the first portion, and
   wherein the first portion and the second portion cooperate to define a third storage space therebetween, the third storage space being equal to a combination of the first storage space and the second storage space, and
   wherein the first portion is removably secured to the second portion such that the first portion is completely detachable from the second portion.

2. The container of claim 1, wherein the first rolling mechanism includes a first roller and a second roller.

3. The container of claim 2, wherein the first roller is one of an omni-roller or a nylon roller.

4. The container of claim 1, wherein the outer surface of the first end wall of the first portion includes a first recessed groove and a second recessed groove, wherein the first recessed groove and the second recessed groove each extend parallel to the longitudinal axis of the first skid, wherein the first recessed groove and the second recessed groove are each disposed between the first skid and the second skid, and wherein the first recessed groove and the second recessed groove are each sized and configured to receive a fork of a forklift.

5. The container of claim 4, wherein the first recessed groove and the second recessed groove each extends from a first end disposed at or adjacent to the first perimeter edge of the outer surface of the first end wall to a second end disposed at or adjacent to the second perimeter edge of the outer surface of the first end wall.

6. The container of claim 1, further comprising a first recess and a second recess on the outer surface of the first end wall of the first portion, the first recess being sized and shaped to receive a top portion of the first skid and the second recess being sized and shaped to receive a top portion of the second skid, and wherein the contact portion of the first skid is disposed on a bottom portion of the first skid and the contact portion of the second skid is disposed on a bottom portion of the second skid.

7. The container of claim 6, wherein the first recess and the second recess each extends parallel to the longitudinal axis of the first skid from a first end disposed at or adjacent to the first perimeter edge of the outer surface of the first end wall to a second end disposed at or adjacent to the second perimeter edge of the outer surface of the first end wall.

8. The container of claim 6, wherein the contact portion of the first skid is planar and the contact portion of the second skid is planar.

9. The container of claim 1, wherein each of the first skid and the second skid is removably attached to the first portion with a removable fastener.

10. The container of claim 9, wherein the removable fastener is a thumb nut.

11. The container of claim 10, wherein the first side wall includes a first plurality of tongues and a first plurality of grooves and the second side wall includes a second plurality of tongues and a second plurality of grooves, the first plurality of tongues being sized and shaped to be received by the second plurality of grooves and the second plurality of tongues being sized and shaped to be received by the first plurality of grooves.

12. The container of claim 11, wherein the first plurality of tongues and the second plurality of grooves are arranged to locate the first rolling mechanism on an opposite side of the container from the second rolling mechanism.

13. The container of claim 1, wherein the first portion is identical to the second portion.

14. The container of claim 1, wherein the container is made of one of plastic and metal.

15. The container of claim 1, wherein the first restraining mechanism is a belt strap.

16. The container of claim 1, further including a first handle on an outer surface of the first side wall.

17. The container of claim 1, further comprising a locking mechanism that releasably secures the first portion to the second portion.

18. The container of claim 1, wherein the first storage space has a length of about 43.75 inches (111.12 cm), a width of about 28.75 inches (73.025 cm), and a depth of about 11 inches (27.94 cm).

19. The container of claim 1, further comprising a raised ridge on the outer surface of the first end wall.

\* \* \* \* \*